June 13, 1967  R. F. DORNAUS  3,324,884
SINGLE-HANDLED VALVE STRUCTURE
Filed July 2, 1963  4 Sheets-Sheet 3
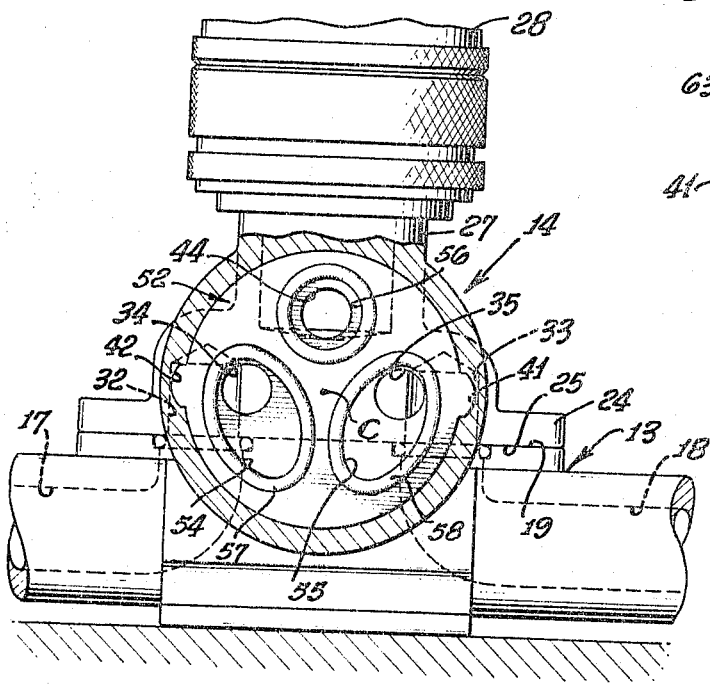
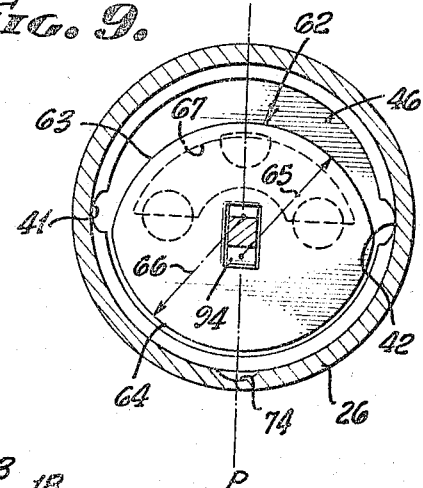
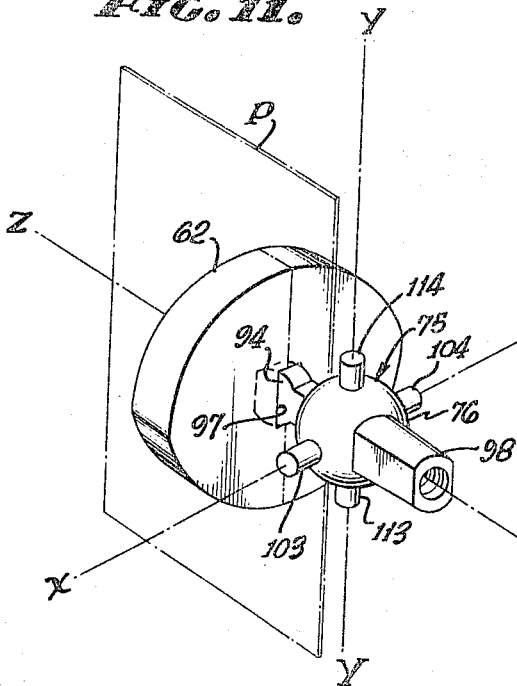
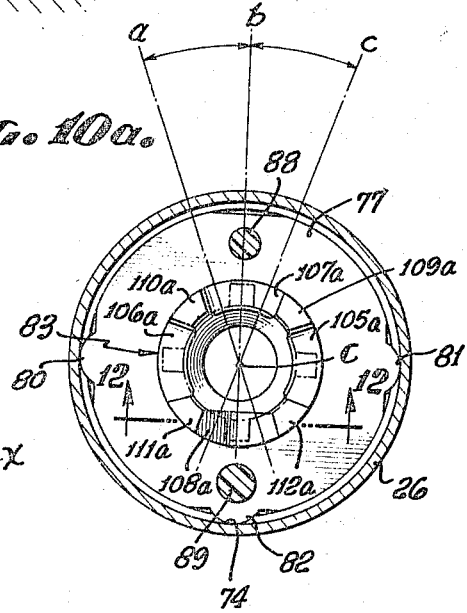
INVENTOR.
REINERT F. DORNAUS
BY
Flam and Flam
ATTORNEYS.

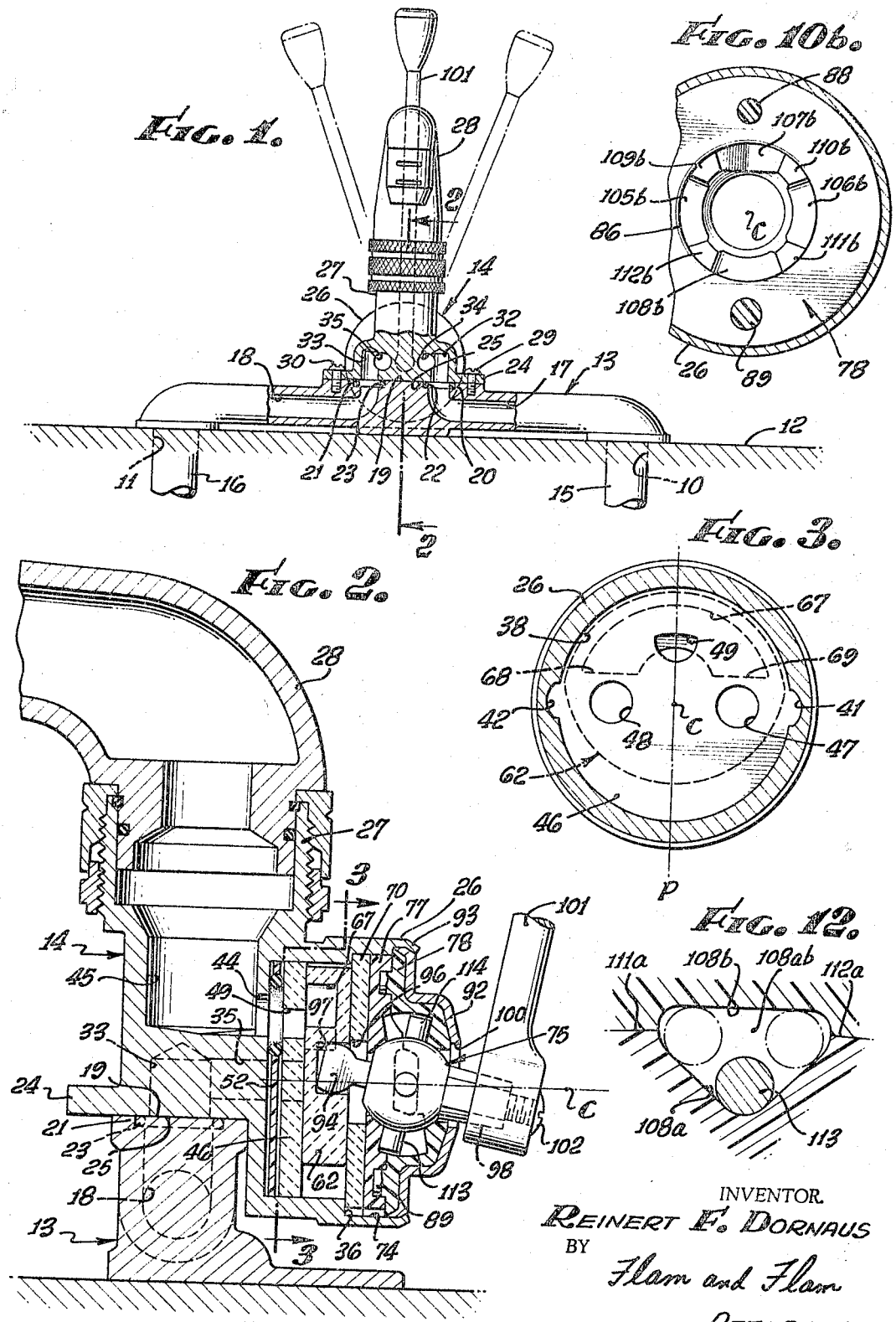

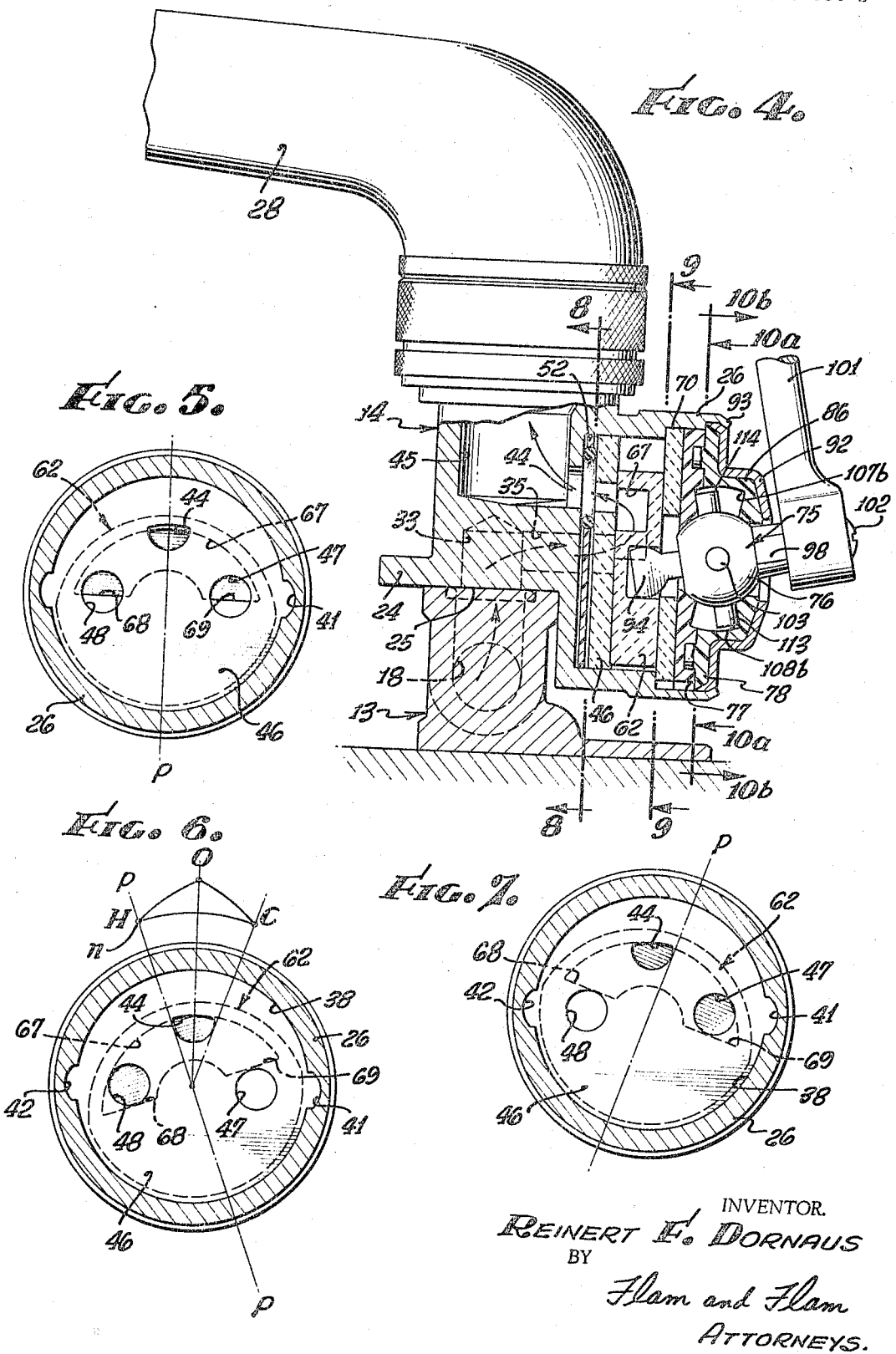

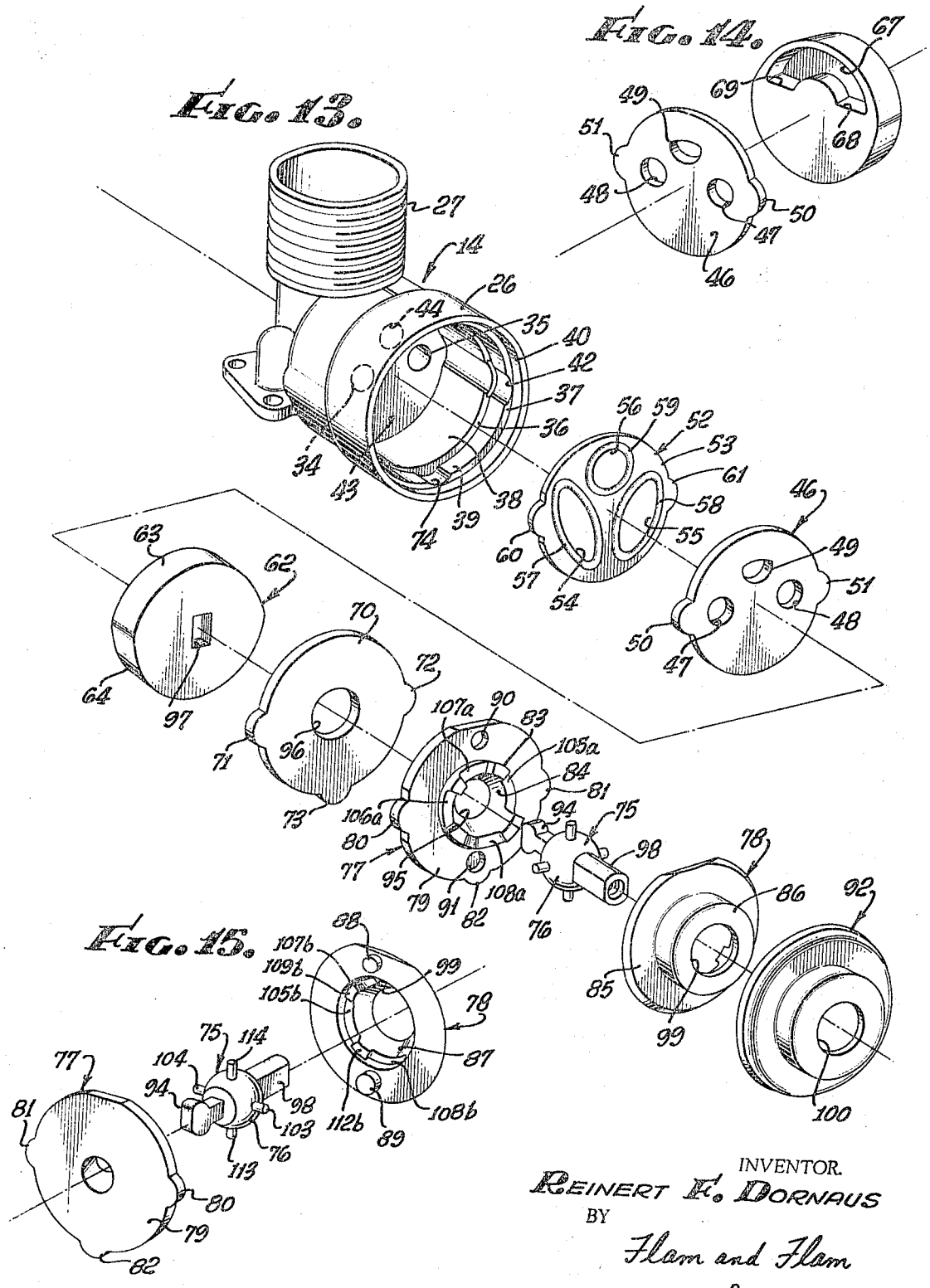

United States Patent Office 3,324,884
Patented June 13, 1967

3,324,884
SINGLE-HANDLED VALVE STRUCTURE
Reinert F. Dornaus, South San Gabriel, Calif., assignor to Price-Pfister Brass Manufacturing Company, Los Angeles, Calif., a corporation of California
Filed July 2, 1963, Ser. No. 292,306
12 Claims. (Cl. 137—625.17)

This invention relates to a single-handled valve structure of a type shown and described in Lyon Patent No. 3,035,612 issued to the assignee of this application.

In said prior patent there is disclosed a valve structure in which a flat valve plate is slidably positioned relative to a valve seat. The valve seat has a hot water inlet, a cold water inlet, and an outlet. An arcuate recess establishes the desired registry. The valve plate is moved by a projection at one end of an operating arm, the other end of which is attached to a handle. A rectangular projection on the arm fits a rectangular recess in the plate. Two side surfaces of the projection are flat, and the other two are rounded. A ball formed at the center of the arm is supported in a socket for universal movement. However, in order to ensure that for each position of the operating handle the valve plate determines one and only one particular valve condition, the valve plate is so confined that it has only two modes of movement, one in a radial direction relative to the valve axis normal to the seat, and the other in an angular direction about that axis. The rectangular projection of the arm and the rectangular recess ensured this result by binding upon any other mode of movement.

In order to impose suitable limits to the valve plate movement and to define a triangular boundary to the courses of movement, and thus a central off position, the valve plate has or carries stops cooperable with a cam structure. While this valve is fairly satisfactory when the valve plate is made of metal, difficulties may be encountered when the valve plate is made of ceramic suitable for efficient sealing purpose. Such ceramic may be brittle or subject to crumbling. It has been found that the stops or the recessing in which they fit deteriorate due to repeated impacts with the cam; the fit between the arm projection and the valve plate recess deteriorates due to repeating binding action; rough handling of the handle may shear off the stops permitting the valve plate to hit the sides of the valve body recess. The results are: a wobbly connection between the handle and the valve plate; loss of confinement of the valve plate for movement in a polar coordinate system with corresponding loss of predictable operation; undue enlargement of the courses of movement of the valve plate; and finally breaking of the valve plate due to impact with the sides of the valve housing. Various attempts have been made to strengthen the valve plate at its stop and at its rectangular recess. No practical solutions have been found prior to the present invention.

Accordingly, it is an object of this invention to provide a practical way of avoiding undue deterioration or wear of a valve plate of this character. Particularly it is an object of this invention to make it possible for a ceramic valve plate to be used without danger of breakage or undue wear. In order to accomplish this objective, the valve plate is confined for movement in a polar coordinate system and limited all by means carried by the operating arm rather than by the valve plate. The forces imposed by the handle are thus absorbed by the valve housing quite independently of the valve plate. The valve plate, through its nonload bearing connection with the operating arm, merely assumes a position as determined by the operating handle.

Another object of this invention is to provide an improved arrangement for preventing leakage of water through the valve when the valve is in the "off" position. For this purpose, use is made of the static pressure urging the valve and the valve plate together.

Another object of this invention is to provide an extremely compact valve occupying but little space at a sink deck or the like.

Still another object of this invention is to provide an improved valve of this character capable of simple assembly.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a front elevational view of a faucet construction incorporating the present invention, a portion of the apparatus being broken away and shown in section;

FIG. 2 is an enlarged vertical sectional view taken along a plane corresponding to line 2—2 of FIG. 1 and showing the valve in closed position;

FIG. 3 is a sectional view taken along a plane corresponding to line 3—3 of FIG. 2;

FIG. 4 is an enlarged sectional view similar to FIG. 2 but illustrating the valve in open position;

FIG. 5 is a sectional view similar to FIG. 3 but illustrating the valve in the open position of FIG. 4;

FIGS. 6 and 7 are sectional views similar to FIG. 5, showing further alternate open positions of the valve structure;

FIGS. 8, 9, 10a and 10b are sectional views taken along planes corresponding respectively to lines 8—8, 9—9, 10a—10a, and 10b—10b of FIG. 4;

FIG. 11 is a diagrammatic view illustrating the mode of movement of the ball shaft relative to the valve plate;

FIG. 12 is an enlarged fragmentary sectional view taken along a plane corresponding to line 12—12 of FIG. 10a;

FIG. 13 is an exploded pictorial view showing the operating parts of the valve mechanism;

FIG. 14 is an exploded pictorial view illustrating the valve plate and valve seat from a side opposite that depicted in FIG. 13; and FIG. 15 is an exploded view illustrating the ball socket parts and the ball shaft from a position opposite that depicted in FIG. 13.

By way of example, the valve structure is shown embodied in a faucet structure (FIG. 1) adapted to be mounted at spaced holes 10 and 11 in the deck surrounding a sink or lavatory 12. The body of the valve comprises two parts 13 and 14, both made of cast brass or other suitable material.

The body part 13 provides depending threaded extensions 15 and 16 projecting into the apertures 10 and 11 for cooperation with suitable supply conduits for cold and hot water.

The body part 13 provides two passages 17 and 18, each leading from the respective extensions 15 and 16 to an upper land 19 located centrally of the body part 13. (See also FIGS. 2 and 8.) The ends of the passages 17 and 18 open upwardly at spaced portions of the land 19 and are slightly enlarged, as at 20 and 21, to accommodate sealing O-rings 22 and 23.

The valve body part 14 has a mounting flange 24 (FIG. 2) providing on its lower side a flat surface 25 engaging the land 19. The flange 24 extends laterally from the bottom of a cup 26 which provides a valve chamber. The cup 26 faces rearwardly of the faucet. Also located at the back of the cup 26 and upon the flange 24 is an upwardly extending nipple 27 forming an outlet from the valve chamber. A swing spout 28 is supported in a conventional manner on the nipple 27.

Cap screws 29 and 30 (FIG. 1) secure the flange 24 against the land 19. An appropriate decorative cover (not shown) may enclose the valve body parts 13 and 14. This cover may be clamped against the sink deck by the aid of a nut 31 (see also FIG. 2) mounted upon the nipple 27.

The valve body part 13 may be modified for wall mounting, or for cooperation with deck holes spaced differently, all without requiring any change in the body part 14.

In order to conduct water from the cold and hot water passages 17 and 18 to the valve chamber defined by the cup 26, appropriate passages are formed in the body part 14. Thus, the flange 24 of the valve body part 14 provides two recesses 32 and 33 (see FIGS. 1 and 8) extending upwardly from the surface 25 and registering with the ends of the body passages 17 and 18. The O-rings 22 and 23 are slightly compressed as the surfaces 25 and 19 are drawn together by the screws 29 and 30. A suitable seal is thus established.

Transverse cold and hot water passages 34 and 35 intersect the recesses 32 and 33 and open at the bottom of the cup 26. The passages 34 and 35 are symmetrically and diametrically disposed on opposite sides of the central axis $c$ of the cup 26.

The cup 26, as shown in FIG. 13, is generally cylindrical in form, having two intermediate shoulders 36 and 37 defining an inner portion 38, an intermediate portion 39, and an outer portion 40. Aligning grooves 41 and 42 are formed on opposite sides of the cup and extend through the intermediate and inner portions 39 and 38 to the bottom wall 43 of the cup recess. Formed in the bottom wall 43 is an outlet passage 44 (see FIG. 2) leading to a recess 45 and the nipple 27. The outlet passage 44 is located above the central axis $c$ as shown in FIG. 3.

A valve seat 46 (FIGS. 2, 4 and 13) made of ceramic material is accommodated in the inner portion 38 of the cup 26 and has cold and hot water ports 47 and 48 as well as an outlet port 49 registering respectively with the body passages 34, 35 and 44. The valve seat 46 is provided with ears 50 and 51 that cooperate with the grooves 41 and 42 of the cup 26 to ensure alignment.

Interposed between the valve seat 46 and the bottom wall 43 of the cup 26 is a seal structure 52 to prevent lateral flow across the bottom wall 43 of the cup 26. The seal structure 52 comprises a retainer 53 made of molded Delrin or the like. The retainer has enlarged oval apertures 54 and 55 (see FIGS. 8 and 13) registering with the cold and hot water passages 34 and 35 on one side and the cold and hot water ports 47 and 48 of the seat 46 on the other side. The retainer also has a circular aperture 56 registering with the outlet passage 44 and outlet port 49. O-rings 57, 58 and 59 are mounted in the apertures 54, 55 and 56. All of the rings are normally circular, but the rings 57 and 58 are caused to conform to the oval contour of the apertures 54 and 55. The retainer 53 is thinner than the corresponding dimensions of the O-rings, and hence floats thereon, even when the O-rings are slightly compressed as the parts are assembled. Exaggerated clearance is depicted in FIGS. 2 and 4. The retainer 53 has ears 60 and 61 cooperable with the grooves 41 and 42 to determine the desired registration.

The outwardly facing surface of the valve seat 46 is accurately ground to flatness. Cooperable with the outer surface of the valve seat 46 is a valve plate 62 that may similarly be made of ceramic material and also accurately ground. The valve plate 62 has a peripheral configuration defined by intersecting cylindrical surfaces 63 and 64. The radii of curvature 65 and 66 of the cylindrical surfaces 63 and 64 are slightly less than the radius of the inner portion 38 of the cup recess. The centers of curvature are spaced slightly from each other, as depicted in FIG. 9, and lie in, or determine, a symmetry plane $p$ of the valve plate 62. This plane $p$, fixed with respect to the valve plate 62, is in a manner hereinafter to be described confined so that the center axis $c$ of the cup 26 always lies in the plane $p$. Yet this plane, and the valve plate with it, can, within limits, move angularly about the center axis $c$, and can, within limits, be radially shifted through the center axis $c$. Thus the valve plate is confined for radial and arcuate movement in a polar coordinate system about the axis $c$.

In order to control the registry of the cold and hot water ports 47 and 48 with the outlet port 49, the valve plate 62 has a generally arcuate cavity 67 (FIG. 14) facing the seat 46. This cavity continuously registers with the outlet port 49. The valve plate recess 67 has end surfaces 68 and 69 capable, respectively, of sweeping across the cold and hot water ports 47 and 48 to control their degree of registry with the recess 67 and thus with the outlet port 49. In the "off" position of the valve depicted in FIGS. 2 and 3, the valve plate 62 is shifted upwardly, and the end surfaces 68 and 69 lie above the passages 34 and 35. Thus there is no flow. When the valve plate 62 is moved downwardly from the position of FIG. 3, both end surfaces 68 and 69 move partially across the cold and hot water inlets 47 and 48 to provide combined flow, and as shown in FIG. 5.

When the valve plate 62 has been shifted downwardly, the symmetry plane $p$ and thus the valve plate 62 may be moved angularly about the center axis $c$ to the extreme positions illustrated in FIGS. 6 and 7. In FIG. 6, the valve plate recess 67 is in full registry with the hot water port 48 and entirely out of registry with the cold water port 47. FIG. 7 illustrates the opposite arrangement.

Shifting movement of the valve plate 62 in a radial direction relative to the central axis $c$ is intended to determine the volume of flow, and angular movement of the valve plate 62 is intended to control the relative opening of the cold and hot water ports 47 and 48. It is furthermore intended that there be but a single "off" position. By means hereinafter to be described, a certain triangular boundary is imposed upon the courses of movement of the valve plate 62.

For purposes of illustrating the movement of the valve plate 62, there is shown in FIG. 6 a point $n$ fixed in the symmetry plane $p$ of the valve plate 62 and located above the valve. The point $n$ may be moved to any position within a triangle O–H–C (corresponding to off, hot and cold). As the point $n$ approaches the apex O, the degree of permitted angular movement of the valve plate 62 and of the symmetry plane $p$ becomes less and less. Thus as the plane $p$ shifts upwardly from the position of FIG. 5, less angular movement is required to move the valve plate recess 67 out of registry with one of the ports and into a limited degree of registry with the other port corresponding to the reduced volume position.

The valve plate 62 is held in the inner recess portion 38 by a backing plate 70 (FIG. 2) made of ceramic or other suitable material. The valve plate 62, made of ceramic, thus slides along elements made of similar material. The backing plate 70 fits against the inner shoulder 36 of the cup 26 and it has ears 71 and 72 respectively fitting the grooves 41 and 42. The plate 70 also has an ear 73 (FIG. 13) that fits a groove 74 located at the bottom of the cup 26 and extendnig along the intermediate recess portion 39.

In order to move the valve plate 62, an operating arm in the form of a ball shaft assembly 75 is provided. The ball shaft assembly 75 has a center ball part 76 supported at the outer end of the cup 26 by the aid of an inner seat part 77 and an outer seat part 78. The inner seat part 77 has a flat base 79 accommodated in the intermediate recess portion 39 and against the backing plate 70. The base 79 has three ears 80, 81 and 82 fitting the grooves 32, 33 and 74. Projecting outwardly from the center of the inner part 77 is a generally circularly extending wall 83 formed to provide a generally hemispherical recess 84 for receiving half of the ball part 76. The outer edge of the wall is grooved for purposes hereinafter to be described.

The outer seat part 78 has a base 85 that fits against the base 79 of the inner seat part 77. Its marginal portion, however, abuts the outer shoulder 37 of the cup 26. The outer seat part 78 has a central outwardly projecting cup 86. The wall 83 of the inner seat part 77 is received within the cup 86. At the bottom of the cup 86, and as shown in FIG. 15, there is provided a generally hemispherical recess 87 for the other half of the ball part 76. The cup is interiorly grooved about the recess 87 for purposes hereinafter to be described.

The outer seat part 78 may be placed into assembled relationship with the inner seat part 77 only in one angular position for reasons presently to appear. For this purpose, the base 85 has circular projections 88 and 89 (FIG. 15) of different size, respectively fitting recesses 90 and 91 (FIG. 13) of the inner seat part 77.

A cap 92, which may be made of suitable metal material, fits the rear surface of the outer seat part 78, and its outer portion is received in the outer enlarged portion 40 of the cup 26. As shown in FIG. 2, the end of the cup 26 is swedged, as at 93, to secure all of the parts in assembled relationship.

When the valve structure is closed, as indicated in FIG. 2, water pressure acts upon the small circular areas of the valve plate 62 at the ends of the ports 47 and 48. This pressure tends to move the valve plate very slightly to the right and against the stop plate 70. In order to prevent leakage due to such movement, the static water pressure is utilized correspondingly to move the valve seat 46 and furthermore to urge it positively against the valve plate 62. It is for this purpose that the recesses 54 and 55 of the seal assembly 52 are enlarged.

Thus the static water pressure acts over a very substantial area of the seat 46 and urges it outwardly against the valve plate 62. The slight movement does not disrupt the seal established by the O-rings since they are normally compressed to an adequate degree. Not only does this arrangement prevent leakage due to static water pressure, but compensation is furthermore provided for the very minor wear that occurs between the valve plate 62 and the seat 46. In actual test, the valve has been proven capable of leak-proof operation for more than a million cycles.

The ball shaft assembly 75 has an operating projection 94 that extends through an opening 95 at the center of the inner seat part 77 and through an access aperture 96 in the backing plate 70 and into a recess 97 formed in the rear surface of the valve plate 62. The projection 94 may be made of hardened steel and press-fitted into a suitable recess formed in the ball part 76. On the opposite side of the ball part 76 is an integral noncircular extension 98 that projects through an aperture 99 formed in the center of the outer seat part 88 and through an access aperture 100 formed at the center of the cap or closure 92. An operating lever 101 is fitted over the extension 98 and secured thereto by a screw 102 by which means the ball shaft assembly 75 and the valve plate 62 are positioned.

The recess 97 is generally of rectangular parallel-epiped configuration, with the symmetry plane $p$ of the valve plate 62 extending midway between, and parallel to, the side walls of the recess 97. The projection 94 has side surfaces fitting the side surfaces of the recess 97. However, the top and bottom surfaces of the projection 94 are rounded to permit their sliding along the top and bottom surfaces of the valve plate recess 97.

In FIG. 11 the valve plate 62 and the ball shaft assembly 75 are illustrated. It will be appreciated, from a consideration of FIG. 11 and the foregoing description, that, relative to the valve plate 62, the ball shaft assembly 75 may be tilted up and down but not laterally due to the fit of projection 94 and the recess 97.

The ball shaft assembly 75 has a symmetry plane YZ passing through the center of the ball part 76. This symmetry plane YZ falls midway between the side surfaces of the projection 94. Due to the fit of the side surfaces of the projection 94 with the side surfaces of the recess 97, the symmetry plane YZ must be coplanar with the symmetry plane $p$ of the valve plate 62, whatever the relative positions of the valve plate 62 and the ball shaft assembly 75. Hence if the plane YZ of the ball shaft assembly is confined so that it always passes through the center axis $c$ of the cup 26, the same must hold true for the valve plate plane $p$.

In the assembled position of the parts, the center of the ball part 76 is, of course, fixed at the center axis $c$ of the cup 26. The fit between the projection 94 and the recess 97 will normally confine the parts so that the axis $c$ always lies within the plane YZ and the symmetry plane $p$ of the valve plate 62. However, other means are provided to ensure this result so as to prevent the imposition of any undue binding force between the projection 94 and the valve plate recess 97.

For this purpose, the ball part 76 has two pins 103 and 104 on opposite sides that extend at right angles to the plane YZ and along an axis $x$ of the ball shaft assembly 75, as depicted in FIG. 11. The pins 103 and 104 are movable respectively in two of four recesses formed generally in an equitorial zone about the ball socket 84–87.

The wall 83 of the socket part 77, as shown in FIGS. 13 and 10a, has grooves 105a, 106a, 107a, and 108a separated by projections 109a, 110a, 111a, and 112a. As shown in FIGS. 15 and 10b, grooves 105b, 106b, 107b, and 108b are formed in the cup 86 and complement the grooves 105a, 106a, 107a, and 108a to form recesses. The recesses 105–108 are separated by projections 109b, 110b, 111b, and 112b that respectively abut the projections 109a, 110a, 111a, and 112a to form end walls for the recesses.

The recesses 105ab and 106ab extend in a plane perpendicular to the center axis $c$ of the cup 26 (see also FIG. 2) and confine the pins 103 and 104 so that the axis $x$ of the ball shaft assembly is always perpendicular to that center axis $c$. The YZ plane of the ball shaft assembly 75 and thus the valve plate symmetry plane $p$ can be shifted radially of the axis $c$ or moved angularly thereabout, but must always include the center axis $c$. This prevents any binding between the projection 94 and the recess 97. As the ball shaft assembly 75 is moved, the valve plate 62 merely assumes an orientation as determined by the projection 97.

When the symmetry plane $p$ is moved angularly about the center axis $c$, the pins 103 and 104 slide along their recesses 105ab and 106ab. As the symmetry plane $p$ is shifted radially along of the center axis $c$, the ball shaft 75 tilts about the pins 103, 104 which act as trunnions. The projections 109ab, 110ab, 111ab, and 112ab, forming the ends of the recesses 105ab and 106ab, in conjunction with means hereinafter to be described, determine the limits of such angular movement.

The top and bottom recesses 107ab and 108ab determine the triangular boundary to the permitted movement of the valve plate. For this purpose, the ball shaft assembly has pins 113 and 114 that extend along the Y axis of the ball shaft assembly 75. The pins 113 and 114 are accommodated with clearance in the recesses 108ab and 107ab respectively. The recesses 108ab and 107ab have a generally triangular shape, as illustrated in FIG. 12.

As the ball shaft assembly 75 is moved to the "off" position, the pin 113 moves inwardly while the pin 114 moves outwardly. The recess 108ab converges toward a central apex 115 formed in the inner seat part 77, and the recess 107ab converges toward an apex 116 formed in the outer seat part 78. The ball shaft thus centers as it is moved to the "off" position. As the valve is moved to the open position, the pins 113 and 114 move away from the apices 115 and 116 along either side wall, or between them, and to the side of the recesses 108 and 107 opposite the apices 115 and 116. These opposite sides determine the limit to the radial shifting movement of the valve plate 62, while the projections 109–112 at the ends of these opposite sides also determine the limits of angular movement. The limits are so situated as to prevent any portion of the valve plate 62 from engaging the inner recess portion 38 of the cup 26. Any excess force imposed upon the handle 101 is absorbed by the socket parts 77 and 78 quite independently of the valve plate 62.

The end of the operating lever 101 lies generally above the valve for convenient access, and moves within a triangular boundary. As it is moved from side to side at a forward position, as indicated in phantom lines in FIG. 1, the valve plate is caused to shift between the O and H positions of FIG. 6. As the handle is moved forwardly and rearwardly, the valve plate is caused to shift from and toward the central "off" position O. By merely pushing the handle rearwardly, the valve returns to the central "off" position. Since the end of the operating lever 101 is at a very substantial distance from the axis of the pins 103 and 104 as compared to the valve plate 62, a substantial forward and rearward movement of the lever $n$ produces the slight shifting movement of the valve plate 62. Appropriate control, free of undue sensitivity, results.

The ball shaft assembly 75 is movable angularly above and below the center axis $c$ substantially by equal amount, and as shown in FIGS. 2 and 4. Thus the center of the recesses 107ab and 108ab are located precisely above and below the center of the ball part 76. This makes it possible for the recessed parts in the respective halves of the socket structure to be relatively shallow. A saving in material results and the axial dimension of the valve cup 26 is minimized.

The inventor claims:

1. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means carried by the body supporting the arm for movement adjacent the valve plate; means confining the valve plate for sliding movement along said seat; a connection between the valve plate and the arm for movement of the valve plate by the arm and including parts maintaining coincidence between a plane fixed with respect to the valve plate and a plane fixed with respect to the arm; mutually guided and engaging parts carried respectively by the body and the operating arm and operable independently of said valve plate to confine said arm so that said plane fixed with respect to said arm moves in a polar coordinate system about an axis perpendicular to the seat; the transmission of force between said parts bypassing said valve plate whereby said valve plate merely follows the movement of said arm.

2. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means carried by the body supporting the arm for movement adjacent the valve plate; means confining the valve plate for sliding movement along said seat; a connection between the valve plate and the arm for movement of the valve plate by the arm and including parts maintaining coincidence between a plane fixed with respect to the valve plate and a plane fixed with respect to the arm; mutually guided and engaging means carried by the body and the operating arm and operable independently of said valve plate to confine said arm so that said plane fixed with respect to said arm moves in a polar coordinate system about an axis perpendicular to said seat; the transmission of force between said means bypassing said valve plate whereby said valve plate merely follows the movement of said arm; and means engageable to determine limits to the radial and arcuate courses of movement of the valve plate comprising parts carried by the body and the operating arm respectively, and preventing lateral impingement of the valve plate on the walls of said chamber; the transmission of force between said parts bypassing said valve plate.

3. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means carried by the body supporting the arm for movement adjacent the valve plate; means confining the valve plate for sliding movement along said seat; a connection between the valve plate and the arm for movement of the valve plate by the arm and including parts maintaining coincidence between a plane fixed with respect to the valve plate and a plane fixed with respect to the arm; mutually guided and engaging means carried by the body and the operating arm and operable independently of said valve plate to confine said arm so that said plane fixed with respect to said arm moves in a polar coordinate system about an axis perpendicular to said seat; the transmission of force between said means bypassing said valve plate whereby said valve plate merely follows the movement of said arm; and means comprising parts carried by the body and said operating arm limiting the radial and arcuate courses of movement of the valve plate so that any point fixed with respect to the valve plate is capable of being positioned only within a substantially triangular area, said limiting means preventing lateral impingement of the valve plate on the walls of said chamber; the transmission of force between said parts bypassing said valve plate.

4. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; said arm having a ball part; means carried by the body and forming a socket for the ball part; means confining the valve plate for sliding movement along said seat; a connection between the valve plate and the arm at a place spaced from the center of said ball part for movement of the valve plate thereby, said connection including mutually guided parts maintaining coincidence between a plane fixed with respect to said valve plate and a plane fixed with respect to said arm and passing through the center of said ball part; and pin means projecting laterally of the ball part at right angles to said planes and passing through said ball part center; said socket forming means having groove means guidingly receiving the pin means and constraining said arm and valve plate so that an axis intersecting said ball part center and perpendicular to said seat always lies in said plane whereby the said valve plate is confined for radial and arcuate movement in a polar coordinate system with respect to said axis.

5. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; said arm having a ball part; means carried by the body and forming a socket for the ball part; means confining the valve plate for sliding movement along said seat; a connection between the valve plate and the arm at a place spaced from the center of said ball part for movement of the valve plate thereby, said connection including mutually guided parts maintaining coincidence between a plane fixed with respect to said valve plate and a plane fixed with respect to said arm and passing through the center of said ball part; and pin means projecting laterally of the ball part at right angles to said planes and passing through said ball part center; said socket forming means having groove means guidingly receiving the pin means and constraining said arm and valve plate so that an axis intersecting said ball part center and perpendicular to said seat always lies in said plane whereby the said valve plate is confined for radial and arcuate movement in a polar coordinate system with respect to said axis, said ball part and said socket forming means having parts determining limits to the radial and arcuate courses of movement of the valve plate and preventing lateral impingement of the valve plate on the walls of said chamber; said parts being operable independently of the valve plate to bypass said valve plate in the transmission of force between said parts.

6. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; said arm having a ball part; means carried by the body and forming a socket for the ball part; means confining the valve plate for sliding movement along said seat; a connection between the valve plate and the arm at a place spaced from the center of said ball part for movement of the valve plate thereby, said connection including mutually guided parts maintaining coincidence between a plane fixed with respect to said valve plate and a plane fixed with respect to said arm and passing through the center of said ball part; and pin means projecting laterally of the ball part at right angles to said planes and passing through said ball part center; said socket forming means having groove means guidingly receiving the pin means and constraining said arm and valve plate so that an axis intersecting said ball part center and perpendicular to said seat always lies in said plane whereby the said valve plate is confined for radial and arcuate movement in a polar coordinate system with respect to said axis, said ball part having supplementary pin means, and said socket forming means having supplementary groove means surrounding said supplementary pin means to determine substantially triangular limits to the courses of movement of said valve plate and preventing lateral impingement of said valve plate on the walls of said chamber; said supplementary groove and supplementary pin means being operable independently of said valve plate to bypass said valve plate in the transmission of force between said supplementary pin means and supplementary groove means.

7. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; said arm having a ball part; means carried by the body and forming a socket for the ball part; means confining the valve plate for sliding movement along said seat; a connection between the valve plate and the arm at a place spaced from the center of said ball part for movement of the valve plate thereby, said connection including mutually guided parts maintaining coincidence between a plane fixed with respect to said valve plate and a plane fixed with respect to said arm and passing through the center of said ball part; mutually guided and engaging pin and groove means between the body and the ball part constraining said arm and valve plate so that an axis intersecting said center and perpendicular to said seat always lies in said plane whereby said valve plate is confined for radial and arcuate movement in a polar coordinate system with respect to said axis; said pin and groove means being operable independently of said valve plate to bypass said valve plate in the transmission of force between said pin and groove means.

8. In a valve structure: a support; an operating arm having a ball member; means carried by the support forming a socket member for the ball part; trunnion means carried by one of the members and having an axis passing through the center of said members; and means forming an equatorially extending track on the other of said members in which the trunnion means is guided, and preventing movement of said trunnion means transversely of said track whereby the operating arm is confined for two modes of movement; a valve member carried by said operating arm; and means forming a valve seat on said support across which said valve member is slidable.

9. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means confining the valve plate for sliding movement along said seat; said arm having a ball part and a pair of pins projecting radially of the ball part on diametrically opposite sides thereof; socket means carried by the body mounting said ball part, and having grooves in which the pins are guidingly received and confined for arcuate movement in an equatorial plane; said grooves preventing movement of said pins transversely of said grooves; and means connecting the valve plate to the arm at a place spaced from the center of the ball part.

10. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means confining the valve plate for sliding movement along said seat; said arm having a ball part and a pair of pins projecting radially of the ball part on diametrically opposite sides thereof; socket means carried by the body mounting said ball part, and having grooves in which the pins are received and confined for arcuate movement in an equatorial plane, said equatorial plane having an axis normal to said plane and passing through the center of said ball part as well as through the center of said socket means; said grooves preventing movement of said pins transversely of said grooves, means forming companion engageable projection and recess means operative between the body and the arm for limiting the tilting movement of the arm about said pins as well as limiting angular movement of the arm about the axis of said equatorial plane; said companion projection and recess means being operable independently of said valve plate to bypass said valve plate in the transmission of force between said companion projection and recess means; and means connecting the valve plate and the operating arm.

11. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means confining the valve plate for sliding movement along said seat; said arm having a ball part and a pair of pins projecting radially of the ball part on diametrically opposite sides thereof; socket means carried by the body mounting said ball part, and having grooves in which the pins are received and confined for arcuate movement in an equatorial plane; said ball having another pin spaced from each of said pairs of pins; said socket means having a substantially triangular recess in which the pin is accommodated for determining limits to the movement of said operating arm; and means connecting the valve plate and the operating arm.

12. In a valve structure: a valve body having wall means defining a chamber and a valve seat in the chamber; means forming a pair of inlet ports in the seat and opening in the chamber; means forming an outlet from the chamber; a valve plate slidable along the seat and having flow control means cooperable with said ports for determining the relative opening of said ports and the combined volume of flow therethrough; an operating arm for moving the valve plate; means confining the valve plate for sliding movement along said seat; said arm having a ball part and a pair of pins projecting radially of the ball part on diametrically opposite sides thereof; socket means carried by the body mounting said ball part, and having grooves in which the pins are received and confined for arcuate movement in an equatorial plane; said ball having a second pair of pins projecting radially of said ball part on diametrically opposite sides thereof in quadrature relationship to said first pair of pins; said socket means having triangular recesses located between said grooves and receiving the pins of the second pair respectively for determining limits to the movement of the operating arm; and means connecting the valve plate and the operating arm.

References Cited

UNITED STATES PATENTS

| 2,977,986 | 4/1961 | Hinderer et al. | 137—625.17 |
| 2,985,422 | 5/1961 | Anderson | 251—172 |
| 3,006,599 | 10/1961 | Eckert | 251—172 |
| 3,023,769 | 3/1962 | Williams | 137—625.17 |
| 3,023,784 | 3/1962 | Monson | 137—625.17 |
| 3,030,980 | 4/1962 | Swart | 137—625.17 |
| 3,035,612 | 5/1962 | Lyon | 137—625.17 |
| 3,105,519 | 10/1963 | Fraser | 137—625.17 |

M. CARY NELSON, *Primary Examiner.*

LAVERNE GEIGER, *Examiner.*

W. CLINE, *Assistant Examiner.*